United States Patent [19]

Schilling

[11] Patent Number: 5,019,168

[45] Date of Patent: May 28, 1991

[54] CATIONIC SLURRY SEAL EMULSIFIERS

[75] Inventor: Peter Schilling, Charleston, S.C.

[73] Assignee: Westvaco Corporation, New York, N.Y.

[21] Appl. No.: 432,167

[22] Filed: Nov. 6, 1989

Related U.S. Application Data

[62] Division of Ser. No. 334,464, Apr. 7, 1989, abandoned.

[51] Int. Cl.$^5$ ............................................. C08Q 95/00
[52] U.S. Cl. ................................. 106/277; 106/273.1; 524/60; 524/59
[58] Field of Search .................... 524/59, 60; 106/273, 106/277

[56] References Cited

U.S. PATENT DOCUMENTS 4,789,402 12/1988 Kostusyk .................... 524/59

Primary Examiner—Joseph L. Schofer
Assistant Examiner—Jeffrey T. Smith
Attorney, Agent, or Firm—Terry B. McDaniel; Richard L. Schmalz

[57] ABSTRACT

A cationic emulsifier obtained from the reaction products of an alkyl phenol, polyamine, and formaldehyde or of an alkyl phenol, fatty acid/polyamine condensate, and formaldehyde and the uses of the emulsifier in cationic bituminous emulsions and paving slurry seal mixtures are disclosed.

7 Claims, No Drawings

CATIONIC SLURRY SEAL EMULSIFIERS

This is a division of application Ser. No. 07/334,464, filed Apr. 7, 1989, now abandoned.

BACKGROUND OF THE INVENTION

1. Field of the Invention

This invention relates to quick set slurry seal emulsions. More particularly, it relates to novel emulsifiers for solventless and solvent containing, mixing grade, oil-in-water cationic bituminous emulsions, which emulsifiers are the reaction products of alkyl phenols, aldehydes and polyamines.

2. Description of Related Art

In paving operations, three main practices are employed to achieve thorough mixing of bitumen and aggregate:

(1) Mixing of free flowing heated asphalt (asphalt cement) with pre-dried aggregate;

(2) Mixing pre-dried aggregate with asphalt diluted with a hydrocarbon solvent (cutback asphalt, cutter stock) at ambient temperatures; and (3) mixing aggregate with asphalt emulsions, e.g., oil-in-water emulsions, obtained by vigorous agitation of asphalt and water in the presence of an emulsifying agent.

Because of increasing cost in energy and hydrocarbon solvents and because of environmental concerns, the use of emulsified asphalt is increasing.

Conventionally, emulsion slurry seals are formulated from mineral aggregate, which is a fine stone aggregate and/or mineral filler and a mixing-grade, quick-setting or slow-setting emulsion containing bituminous residue (usually asphalt) and water to attain slurry consistency. Usually, densely-graded aggregates, such as granite screenings, limestone screenings, dolomite screening and blast furnace slag, are combined with bituminous emulsions to produce slurry seal compositions.

When a slurry seal is used in paving and road maintenance, the mixture of emulsified bituminous material and fine-grained aggregate is held in suitable suspension until applied to the road surface. The slurry seal emulsion is of an oil-in-water type.

Depending on the emulsifier used to achieve an emulsion, anionic or cationic emulsions are obtained. In anionic emulsions, asphalt droplets are negatively charged; in cationic emulsions, the asphalt droplets bear positive charges.

In a bituminous emulsion formulated using cationic emulsifiers the bituminous material is deposited from the emulsion on siliceous or granitic aggregate surfaces due to the attraction of polar charges between the positively charged bituminous droplets and negatively charged aggregate surfaces.

Cationic emulsions have been obtained by employing a variety of nitrogen containing organic compounds, such as fatty amines, fatty diamines, fatty triamines, fatty amidoamines, fatty imidazolines, and reaction products of all these compounds with ethylene oxide and fatty mono- and diquaternary ammonium salts. The fatty radical of these compounds can have a variety of chemical structures, and the building blocks for the preparation of these amines can be obtained from a variety of sources, such as petroleum refinates, animal fats, vegetable and fish oils, and tall oil. Amidoamines suitable as emulsifiers are disclosed in U.S. Pat. No. 3,230,104 to Falkenberg and in U.S. Pat. No. 3,097,174 to Mertens. Combinations of fatty monoamines and triamines are disclosed in U.S. Pat. No. 3,738,852 to Doi; fatty diamines are disclosed in U.S. Pat. No. 3,728,278 to Trameli and U.S. Pat. No. 3,581,101 to Gzemski; fatty quaternary and diquaternary salts and modifications thereof are disclosed in U.S. Pat. No. 3,220,953 to Borgfeldt, U.S. Pat. No. 3,867,162 to Elste, U.S. Pat. No. 3,764,359 to Dybalski, U.S. Pat. No. 3,957,524 to Doughty and U.S. Pat. No. 3,466,247 to Ohtuka, and fatty imidazolines are taught in U.S. Pat. No. 3,445,258 to Ferm. The use of tallow quaternary ammonium salts and tallow diquaternary diammonium salts for making emulsions suitable for slurry seal in solventless applications is described in U.S. Pat. No. 3,764,359 to Dybalski.

The uses of acidified reaction products of certain polycarboxylic acids, anhydrides, sulfonated fatty acids and epoxidized glycerides with certain polyamines as emulsifiers yielding asphalt emulsions which can be mixed with fine grained aggregate to give workable aggregate/emulsion mixes are disclosed in U.S. Pat. No. 4,447,269 to Schreuders et al., U.S. Pat. No. 4,450,011 to Schilling et al., U.S. Pat. No. 4,547,224 to Schilling et al., U.S. Pat. No. 4,462,890 to Schilling et al., U.S. Pat. No. 4,464,286 to Schilling, U.S. Pat. No. 4,561,901 to Schilling, U.S. Pat. No. 4,597,799 to Schilling, and U.S. Pat. No. 4,676,927 to Schilling et al. The use of a quaternary amine obtained by reacting epicholorohydrin, trimethylamine and nonylphenol for solventless mixes is disclosed in U.S. Pat. No. 3,957,524 to Doughty.

Quick-setting bituminous emulsion compositions wherein amine and alkanolamine salts of alkylbenzenesulfonic acid are used as emulsifiers are disclosed in the U.S. Pat. No. 4,657,595 to Russell.

The general object of this invention is to provide novel versatile cationic emulsifiers for solventless and solvent containing, rapid setting, mixing grade, oil-in-water bituminous emulsions.

Another object is to provide a cationic bituminous emulsion for mixing with aggregates whose coating characteristics and set time can be varied.

SUMMARY OF THE INVENTION

It has been found that emulsifiers capable of producing cationic quick set slurries may be obtained by the reaction product of an alkylphenol such as octylphenol, nonylphenol or dodecylphenol with a polyamine such as aminoethylpiperazine and with an aldehyde such as formaldehyde. Cationic emulsifiers may also be obtained by using a fatty amidoamine or imidazoline in place of the polyamine. By varying the ratios of reactants, a series of products with various molecular weights and various ratios of hydrophobe/hydrophile can be obtained.

DETAILED DESCRIPTION OF THE PREFERRED EMBODIMENT

The cationic slurry seal emulsifier of this invention comprises the reaction product of an alkyl phenol, a polyamine and an aldehyde by the Mannich reaction, whereby nitrogen functionality is introduced onto the phenyl ring at the unsubstituted position ortho or para to the phenolic hydroxyl group:

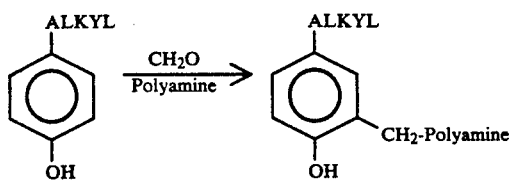

Any alkyl phenol may be used in the practice of this invention, so long as it has at least one unsubstituted position ortho or para to the phenolic hydroxyl group. Preferably the alkyl group has 8-20 carbons, most preferably 8-12 carbons. Examples of suitable alkyl phenols include octylphenol, nonylphenol, and dodecylphenol.

Polyamines suitable to undergo the Mannich reaction with formaldehyde or other aldehydes, as well as polyaldehydes are imidazoline forming polyethylene amines and polyamines characterized by at least one ethylene diamine functional group with at least three hydrogens attached to the two nitrogens. Compounds of this group which are able to give both amidoamines and imidazolines are: ethylene diamine, diethylene triamine, triethylene tetramine, tetraethylene pentamine, pentaethylene hexamine, and higher homologues; N-aminoethylpropane diamine, N,N-diaminoethyl propane diamine and the N-aminoethyl or N,N-diaminoethyl substituted butane diamines, pentane diamines and hexane diamines, as well as N-hydroxy ethyl ethylene diamine. These compounds have the general formulae:

$H_2NCH_2CH_2NHR$ $R = H-, CH_3-, C_2H_5-, C_3H_7-,$ $-CH_2CH_2OH, -(CH_2CH_2NH)_xH$ $x = 1, 2, 3, 4, ... 10$ or $R'R''N(CH_2)_y NHR'''$ $R' = H-, CH_3-, C_2H_5-, C_3H_7-,$
$NH_2CH_2CH_2-,$ $R'' = H-, CH_3-, C_2H_5,$ $R''' = H-, CH_3-, C_2H_5-, C_3H_7-,$
$NH_2CH_2CH_2-,$ $y = 2, 3, 4, 5, 6$.

Amines capable of forming amidoamines but not imidazolines are: 1,3-diaminopropane; 1,4-diaminobutane; 1,5-diaminopentane; 1,6-diaminohexane; piperazine (1,4-diazocyclohexane); N-aminoethyl piperazine; N-hydroxyethyl piperazine; N-aminopropyl propane diamine; 1,3-N-methyl-N-aminopropylpropane diamine; 1,3-N, N-dimethylpropane diamine; 1,3-N, N-diethylpropane diamine; 1,3-N, N-dimethylethylene diamine; N-aminohexyl hexane diamine-1,6.

Diamines whereby the amino groups are separated by polyethylene oxide chains or polypropylene oxide chains are also very suited for the Mannich reaction. These compounds have the general formulae:

$H_2NCH_2CH_2O(CH_2CH_2O)_xCH_2CH_2NH_2$ $x = 0-100$

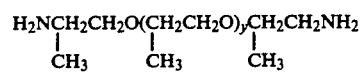

$y = 0-100$

The above described amines can be further modified by reaction with alkylating agents or cross-linking agents such as are described in U.S. Pat. No. 4,775,744 by P. Schilling et al. in connection with lignin modification. Modified amines or amine mixtures with increased molecular weight or amines which have additional reactive functionalities such as sulfonic acid, carboxyl, hydroxyl, nitrile, and quaternary-ammonium groups will be obtained. For the aminomethylation, however, it is necessary that at least one hydrogen on any of the nitrogens of the parent polyamine be available for the condensation with formaldehyde.

The polyamine as used in the practice of this invention may be a mixture of two or more of the compounds described above. An example of a commercially available polyamine is the polyamine sold by Union Carbide under the designation of Amine HH. Amine HH is a blend of polyamines consisting mainly of aminoethyl-piperazine and triethylene tetramine.

Suitable reactants for the Mannich reaction include the following: aldehydes such as formaldehyde (the preferred reagent), benzaldehyde, or other tertiary aldehydes; dialdehydes such as glutaraldehyde and glyoxal; or unsaturated aldehydes such as acrolein or croton aldehyde.

To produce the emulsifier of the present invention, the desired amounts of alkylphenol and polyamine are blended and the mixture is diluted with isopropanol to make an approximately 70% solution. To this blend, the desired amount of a 37% formaldehyde solution is added slowly with stirring (the reaction is exothermic). The mixture is heated to 90° C. for 3 hours.

The relative amount of alkyl phenol and polyamine added depends on the hydrophobe/hydrophile ratio desired in the final product. An increasing number of nitrogen atoms increases the solubility in mineral acids such as HCl and $H_3PO_3$.

The use of a polyamine in the Mannich reaction allows for cross-linking the polyamine with the aldehyde and results in a series of products with various molecular weights and various ratios of hydrophobe/hydrophile. Examples for this type of reaction are the products obtained from p-dodecylphenol, formaldehyde, and aminoethylpiperazine:

Low molecular weight products:

(a) Mono-substitution on phenol. Phenol/Amine (1:1)

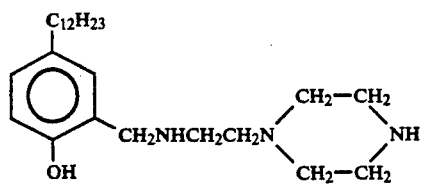
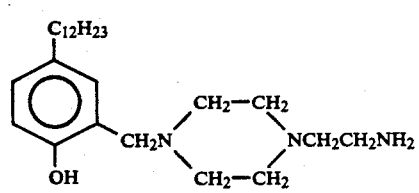
(b) Mono-substitution on phenol. Phenol/Amine (2:1)
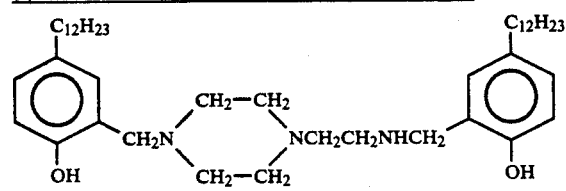
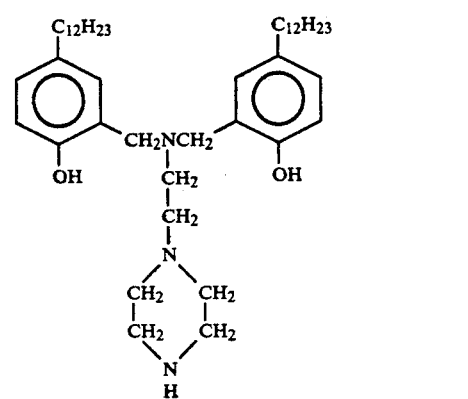
(c) Di-substitution on phenol. Phenol/Amine (1:2)
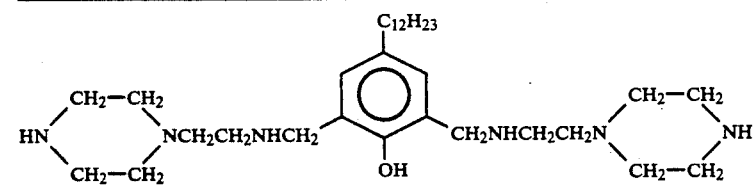
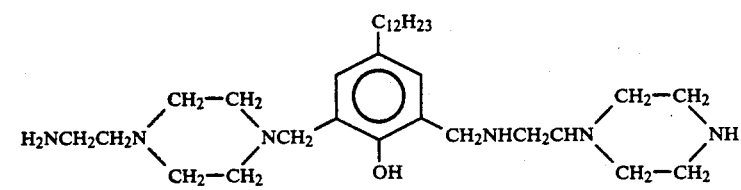
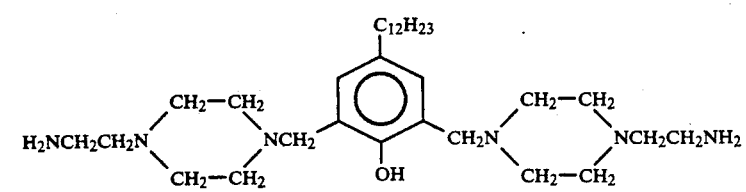
(d) Cross-linking of polyamine with formaldehyde and di-substitution of phenol.

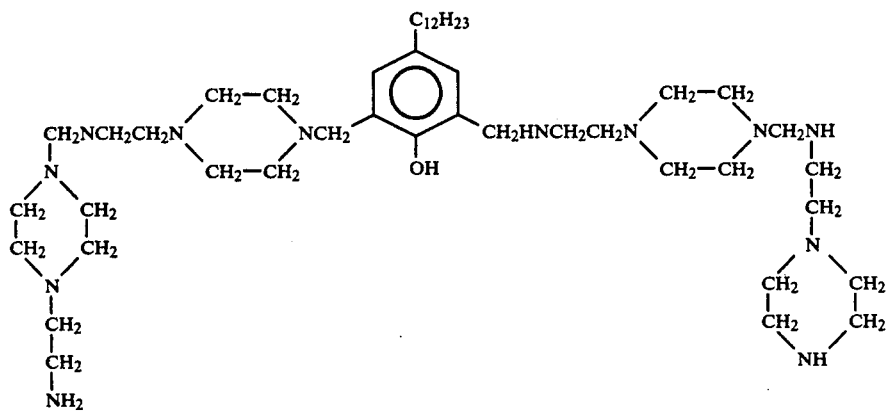

20

Further products may be obtained by using fatty amidoamines or imidazolines in combination with or in place of the polyamine in the condensation reaction with an alkyl phenol. Suitable fatty amidoamines or imidzaolines include the condensation products of polyamines with tall oil fatty acid, or with tall oil fatty acid modified by the addition of acrylic acid, methacrylic acid, fumaric acid or maleic anhydride. Examples of suitable fatty acid/polyamine condensates are found in U.S. Pat. No. 4,447,269 issued to Schreuders, et al., and U.S. Pat. No. 4,561,901 issued to Schilling, the disclosures of which are incorporated herein by reference.

Fatty acid/polyamine condensates are available commercially from Westvaco Corporation and are sold under the trademarks Indulin® RK-1, Indulin® MQK, and Indulin® MQK-1M. In the preparation of the emulsifier with a fatty acid/polyamine condensate, the fatty acid/polyamine condensate is blended with an alkyl phenol and the mixture is diluted with isopropanol. A 37% solution of formaldehyde is added slowly with stirring (the reaction is exothermic) and the mixture is heated at 90° C. for 3 hours.

Condensation products of p-dodecylphenol with formaldehyde and fatty acid/aminoethylpiperazine condensates can be visualized as follows:

(TOFA-Amidoamine):

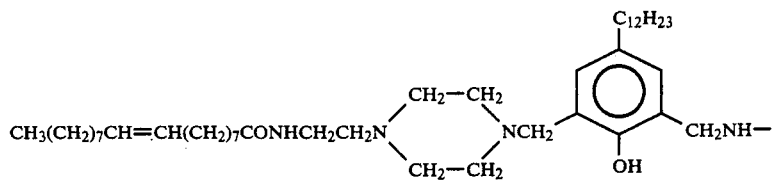

$C_{21}$-dicarboxylic acid diamidoamine:

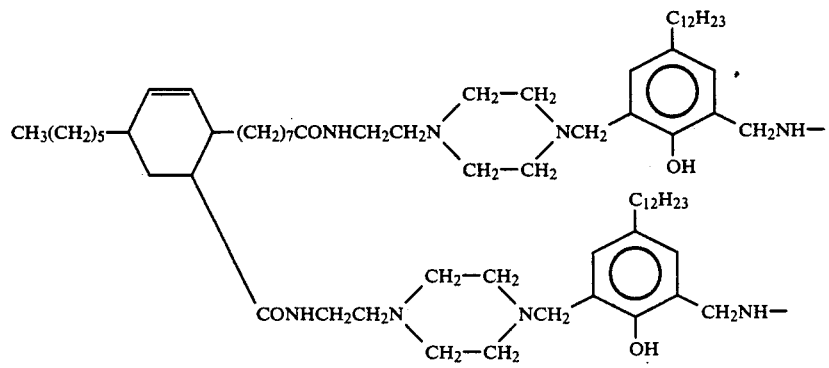

$C_{22}$-tricarboxylic acid triamidoamine

-continued

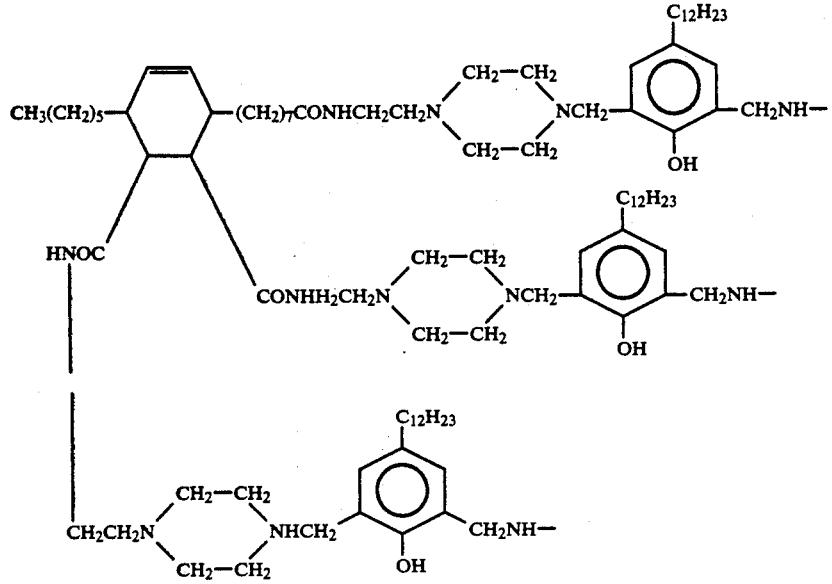

In preparing the cationic bituminous emulsions of this invention, an aqueous acidic solution of the emulsifiers described below is intimately mixed with bitumen under high shear in a colloid mill. The bitumen content can range from 30% to about 80% by weight, preferably between 60% and 70%. The dosage of the emulsifier can range from 0.1-10% by weight of the emulsion, preferably between 0.5-2% by weight of the emulsion. Water makes up the remainder to 100%. Dependent on the emulsifier, a slurry grade cationic emulsion is obtained in a pH range of 1-7, with the optimum performance at a pH of about 1.5-2.5.

The "bitumen" used in the emulsion may be derived from domestic or foreign crude oil; it also includes bitumen, natural asphalt, petroleum oil, oil residue of paving grade, plastic residue from coal tar distillation, petroleum pitch, and asphalt cements diluted from solvents (cutback asphalts). Practically any viscosity or penetration graded asphalt cement for use on pavement construction as described in ASTM designation D-3381 and D-946 may be emulsified with the aid of the emulsifiers of this invention.

In instances where it is desired to alter the performance of the emulsion to obtain improved viscosity at a given asphalt content or improved stability to dust and fines, one of two methods may be employed. Either a mixture of tall oil fatty acids, preferably tall oil pitch, can be added to the bitumen (asphalt) prior to emulsification to control break time or improve the viscosity of the emulsion, or blends of amidoamines with compatible cationic or nonionic emulsifiers may be used for the emulsification of the bitumen. Auxiliary emulsifiers, which may constitute up to 90% of the total combined emulsifier formulation, are fatty amines, fatty propane diamines, fatty amidoamines, and fatty imidazolines. Others are fatty monoquaternary ammonium salts and fatty diquaternary diammonium salts and nonionic emulsifiers, such as ethylene glycol polyethers of nonyl- or dodecyl phenol.

A cationic soap solution is normally obtained by suspending the alkyl phenol/polyamine/aldehyde reaction product or the alkyl phenol/fatty acid-polyamine condensate/aldehyde reaction product in water to which a sufficient amount of a suitable acid, for instance hydrochloric, sulfuric, and phosphoric acid or the like is added until the desired pH value below 7 is reached and a clear emulsifier solution is obtained. Thereafter, the soap solution, which is preheated to 55° C., and the fluid asphalt, which is preheated to 120°-125° C., are mixed under high shear in a colloid mill to give asphalt emulsions of brown color and creamy texture. Prior to testing according to ASTM D-244, the emulsions are stored at 70° C. for 16 hours.

The paving slurry seal mixture is prepared by mixing a mineral aggregate, from about 8% to about 20% (based on weight of the aggregate) of the cationic bituminous emulsion, from about 4% to about 16% water and up to 3% of an inorganic additive such as Portland cement, hydrated lime, limestone dust or fly ash, or an organic additive such as polymer latex. Such additives should comply with the requirements of ASTM D-242.

The aggregates used in the paving slurry seal mixtures of this invention are densely graded aggregates which range in size from anything passing through a No. 4 sieve to at least 80% retained on 200 mesh.

Depending on the type of aggregate and its cleanliness, mixing is improved when aggregate is prewetted with 1-5% water by weight of the aggregate. The performance of the asphalt emulsions in regard to mixing characteristics and setting (higher percentage of one-hour washoff coat) can, if necessary, also be improved when, based on the weight of asphalt, 1-15% of a solvent such a diesel oil is added to the asphalt prior to emulsification. The emulsions prepared with the emulsifiers disclosed in this invention are stable and can be stored for a long period of time until required for use.

Depending on the intended application, the emulsion may be mixed with the aggregate at a central mixing plant in a large pug mill and the mix transported to the job site. Alternatively, the emulsion may be taken to the job site and mixed there, either with a mixing device, such as motorized mixing equipment, or manually.

As a paving technique at the roadsite, a mobile self-propelled unit capable of uniformly metering the aggregate, water, inorganic and organic additives emulsion components may be used. A typical unit is equipped with separate tanks for aggregate, water emulsion and additives which are continually metered into a mixing chamber at a pre-determined ratio. The continually fed components are retained in the mixing chamber for approximately one minute and then fed into a spreader-box and applied to the surface to be coated. Batch operated pneumatic devices can also be used for suitable placement of the bituminous aggregate slurries of this invention.

The practice of this invention may be seen in the following examples wherein the preparation of various types of slurries of the invention is described.

EXAMPLE 1

The following variety of alkyl phenol/polyamine/aldehyde emulsifiers were prepared for emulsion-aggregate slurry testing.

Emulsifier A

An emulsifier with a weight ratio of 52.8:37.5:9.2 of dodecyl phenol, Amine HH, and formaldehyde, respectively, was prepared as follows: 58.2g of dodecylphenol and 37.5g of Amine HH were dissolved in water/isopropanol to yield a 70% solution. 24.86g of a 37% formaldehyde solution was added slowly with stirring and the mixture was heated three hours at 90° C.

Emulsifier B

An emulsifier with a weight ratio of 52.8:50:12 of dodecyl phenol, Amine HH and formaldehyde, respectively, was prepared as above.

Emulsifier C

Weight ratio of 52.8:50:12 of nonylphenol, Amine HH, formaldehyde, respectively, prepared as above.

Emulsifier D

Weight ratio of 52.8:75:18.1 of dodecylphenol, Amine HH, and formaldehyde, respectively, prepared as above.

Emulsifier E

Weight ratio of 52.8:87.5:21.1 of dodecylphenol, Amine HH and formaldehyde, respectively, prepared as above.

EXAMPLE 2

Cationic emulsions were prepared with 64% asphalt (either Exxon ® 85/100 penetration asphalt or Edgington hard base), 1.5% emulsifier at pH 2.5 (adjusted with hydrochloric acid) and water to make up 100% (percentages based on weight of asphalt). Emulsions were prepared for each of the emulifiers described in Example 1.

Next, slurries were prepared by mixing, for each slurry prepared, 100 grams of Camak (Georgia) granite screenings aggregate, 12 grams of a cationic aqueous bituminous emulsion, and 14 grams water. Additional samples were prepared with 2 grams cement or 0.05 grams aluminum sulfate added to the mix.

The materials were mixed in a mixing bowl until a homogeneous slurry mixture was obtained. This mix design is necessary to simulate field conditions. The inability to form a stable slurry within 1 to 2 minutes of mixing time when proper proportions of each ingredient are used would indicate a mixture in which the materials are not compatible. After the slurry was mixed, it was spread in a mold placed on an asphalt felt. The set/break time was measured by blotting the exposed slurry surface with a paper towel. The slurry is considered to be "set" when no stain is transferred to the towel. Many other tests such as described in ASTM D-3910 could be used to measure strength and other physical properties of slurry. The Performance Guide for Slurry Seal published by the Asphalt Emulsion Manufacturers Association is used to measure the performance of the slurry seal.

The percent of retained asphalt coating on the aggregate was determined visually after curing of the mixes at room temperature overnight and boiling in water for 10 minutes.

The slurry curing time was determined by means of a modified ASTM D-3910 cohesive strength tester. The modified cohesive tester consists essentially of (1) a frame, (2) instrument panel, (3) pressure gauge, (4) pressure regulator, (5) 4-way air valve and (6) a double-rod air cylinder mounted vertically so that a (7) rubber faced foot when lowered by air pressure against a specimen may be manually twisted to failure by a (8) peak-reading torque wrench.

Specimens are prepared and cast in a 60 mm diameter mold. A 6 mm-deep mold is used for aggregates 100% passing the 4.75 mm (#4 or 3/16") sieve and a 10 mm-deep mold is used for aggregates 100% passing the 8 mm (5/16") sieve. The specimens are cast on 10 cm (4") squares of non-absorptive 16-pound bitumen mountings.

The modified cohesion tester is similar to the Armak ASTM D-3910-80 machine except that it is designed for a constant regulated air supply, and has a convenient 4-way cylinder valve to operate the cylinder at controlled rate of speed. The cylinder is larger and more rugged. The contact foot used here is a flat ¼ neoprene disc of 50-60 durometer hardness, 1-18" diameter rather than a 1" diameter plug cut from an automobile tire. The procedures used may be found in ISSA Technical Bulletin TB #139 12/82. The pressure exerted on the foot is 92.3% of the gauge reading. The test pressure is set at 200 kPa (28.44 psi) and the cylinder foot is lowered against the centered specimen and allowed to compact the specimen for 5 to 6 seconds. The torque meter is placed on the upper cylinder rod end and twisted by hand in a firm smooth horizontal motion through 90° to 120° of arc within .7 to 1.0 second. The maximum torque pointer is read and the results recorded, the foot raised and cleaned and torque pointer is reset.

A series of specimens were prepared by casting a fresh mixture into 6 mm diameter rings 6 or 10 mm thick and centered on a non-absorbent surface such as 10 cm squared of 15-pound saturating roofing felt. Peak torques Were recorded at 5, 15, 30, and 60 minutes.

The flow behavior, set/break time and the percent of retained asphalt coating on the aggregate was determined for slurries made with emulsifiers A, B, C, D, and E, with and without Portland cement or aluminum sulfate added to the mix. Cohesive strength testing was done for slurries made with emulsifiers B and C with aluminum sulfate. Tests results are set out in Table I below:

TABLE I

Evaluation of Nonylphenol and Dodecylphenol Amine HH-Formaldehyde Condensates

| Emulsifier | Type of Asphalt | Mixing Conditions[a] (%) | Flow Behavior | Set (min) | % Coating[b] | Cohesive Strength (psi) after (min) | | | |
|---|---|---|---|---|---|---|---|---|---|
| | | | | | | 5 | 15 | 30 | 60 |
| A | Edgington Hard Base | — | Broke in 10 secs. | — | — | | | | |
| | | 2C | Broke in 05 secs. | — | — | | | | |
| | | 0.05Al | Excellent | 60+ | 98 | | | | |
| B | Exxon 85/100 pen | — | Broke in 30 secs. | — | — | | | | |
| | | 2C | Broke in 05 secs. | — | — | | | | |
| | | 0.04Al | Excellent | 60 | 95+ | 8.6 | 10.5 | 13.4 | HP[c] |
| C | Exxon 85/100 pen | — | Broke in 20 secs. | — | — | | | | |
| | | 2C | Broke in 05 secs. | — | — | | | | |
| | | 0.04Al | Excellent | 60+ | 95+ | 13.8 | 12.1 | 12.8 | 13.3 |
| D | Edington Hard Base | — | Good | 1 | 90 | | | | |
| | | 2C | Broke in 05 secs. | — | — | | | | |
| | | 0.05Al | Excellent | 60 | 95 | | | | |
| E | Edgington Hard Base | — | Broke in 30 secs. | — | — | | | | |
| | | 2C | Broke in 05 secs. | — | — | | | | |
| | | 0.05Al | Excellent | 60+ | 98 | | | | |

[a] c: cement, Al: alum; % based on the weight of the aggregate.
[b] retained coating after boiling in water for 10 minutes.
[c] HP: hydroplaning - indicates strength in excess of 20 psi As seen from Table I, it was necessary to add aluminum sulfate retarder to the mixing water in order to achieve the desired mix stability. When no retarder was added, the break time became longer with increasing amounts of Amine HH and formaldehyde in the emulsifier molecule. After going through a maximum at a phenol:amine ratio of about 1:1.5 (by keeping the Amine HH:formaldehyde ratio constant at about 4.16:1) the mix stability decreased again. Addition of 2% cement (Type III) caused premature break of the mixes. Comparing condensates prepared from dodecylphenol or nonylphenol with Amine HH and formaldehyde, emulsions prepared with the latter broke faster when no retarder was added to the mixing water. The cohesive strength development of the mix prepared with the dodecylphenol derived polyamine containing emulsions was somewhat faster. After 60 minutes, cohesive strength of at least 20 psi was obtained as indicated by hydroplaning. Desirable adhesion results were obtained with all the emulsions which could be properly mixed with the aggregate.

EXAMPLE 3

The following variety of fatty alkyl phenol/aldehyde/fatty acid-polyamine condensate emulsifiers were prepared for emulsion aggregate slurry testing:

Emulsifier F

An emulsifier with a weight ratio of 80:10:0.74 of Indulin MQK, nonylphenol, and formaldehyde respectively was prepared as follows:

100g of Indulin MQK was blended with 12.5g nonylphenol and the mixture was diluted with isopropanol. 2.5g of a 37% formaldehyde solution was added slowly with stirring and the mixture was heated to 90° C. for three hours.

Emulsifier G

Weight ratio of 80:20:1.48 of Indulin MQK, nonylphenol and formaldehyde, respectively, prepared as above.

Emulsifier H

Weight ratio of 80:30:2.22 of Indulin MQK, nonylphenol and formaldehyde, respectively, prepared as above.

Emulsifier I

Weight ratio of 100:25: 1.85 of Indulin MQK-1M, nonylphenol and formaldehyde, respectively, prepared as above.

Emulsifier J

Weight ratio of 100:50.3.7 of Indulin MQK-1M, nonylphenol and formaldehyde, respectively, prepared as above.

EXAMPLE 4

Cationic emulsions were prepared with 64% asphalt (Edgington hard base), 1.5% emulsifier at pH 2.5 (adjusted with hydrochloric acid) and water to make up 100% (percentages based on weight of asphalt). Emulsions were prepared for each of the emulifiers described in Example 3.

Next, slurries were prepared by mixing Camak (Georgia) granite screenings aggregate, a cationic aqueous bituminous emulsion, and water in the same manner as described in Example 2.

The set/break time of each slurry and the percent of retained asphalt coating on the aggregate were determined using the testing procedures described in Example 2. The results are reported in Table II, below:

TABLE II

Evaluation of INDULIN MQK and INDULIN MQK-1M Reacted with Nonylphenol and Formaldehyde[a]

| Emulsifier | Mixing Conditions[b] (%) | Flow Behavior | Set (min) | % Coating[c] |
|---|---|---|---|---|
| F | — | 14W 12E Good | 1 | 95+ |
| | 2C | 14W 12E Excellent | 20 | 80 |
| | 0.05 Al | 11W 12E Excellent | 60+ | 90+ |
| G | — | 14W 12E Good | 1 | 90 |
| | 2C | 14W 12E Excellent | 8 | 75 |
| | 0.05 Al | 9W 12E Excellent | 60+ | 95 |
| H | — | 14W 12E Good | 9 | 95+ |
| | 2C | 14W 12E Poor | 1 | 80 |
| | 0.05 Al | 10W 12E Excellent | 60+ | 95 |
| I | — | 14W 12E Broke in 08 secs. | — | — |

TABLE II-continued
Evaluation of INDULIN MQK and INDULIN MQK-1M
Reacted with Nonylphenol and Formaldehyde[a]

| Emul-sifier | Mixing Conditions[b] (%) | Flow Behavior | Set (min) | % Coating[c] |
|---|---|---|---|---|
|  | 2C 14W 12E | Excellent | 5 | 70 |
|  | 0.05 Al 10W 12E | Excellent | 60+ | 95 |
| J | — 14W 12E | Broke in 10 secs. | — | — |
|  | 2C 14W 12E | Excellent | 7 | 70 |
|  | 0.05 Al 10W 12E | Excellent | 60+ | 95 |

[a]Edgington Hard Base: 64% asphalt content; 1.5 emulsifier; pH value: 2.5; Camak-aggregate; Mixing time 30 secs.
[b]W: water; E emulsion; C: cement; Al: alum; % based on the weight of the aggregate.
[c]Retained coating after boiling in water for 10 minutes.

As shown above, the emulsifiers obtained from INDULIN MQK containing up to 37.5% nonylphenol (based on INDULIN MQK) could be mixed with aggregate with or without the addition of a set retarder. Excellent mixes were obtained in the presence of alum in the mixing water or cement in the aggregate as long as the nonylphenol content was not higher than 25% based on INDULIN MQK.

Depending on the type of emulsifier and type and amount of retarder, set times varied between one minute and one hour plus. Mixes containing cement showed less retained asphalt after subjection to the boiling test.

Emulsions prepared with INDULIN MQK-1M/nonylphenol/formaldehyde condensates could only be mixed with the addition of cement or alum to the aggregates. Set times were less than ten minutes when 2% cement based on the aggregate was used. In the presence of 0.05% alum, set times were more than one hour.

While the invention has been described and illustrated herein by references to various specific materials, procedures and examples, it is understood that the invention is not restricted to the particular materials, combinations of materials, procedures and selected for that purpose. Numerous variations of such details can be employed, as will be appreciated by those skilled in the art.

I claim:

1. An improved emulsifier for cationic bituminous emulsions comprising the reaction product of (a) an alkyl phenol of the general form

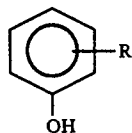

where R represents a linear or branched alkyl group, (b) an aldehyde, and (c) a polyamine compound wherein the improvement comprises a polyamine compound formed as the reaction product of a polyamine and a compound selected from the group of a tall oil fatty acid, a polycarboxylic acid corresponding to the formula

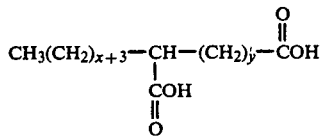

and a polycarboxylic acid corresponding to the formula

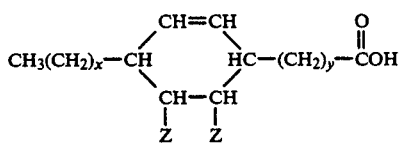

wherein x and y are integers from 3 to 9, x and y together equal 12, at least one Z is a carboxylic acid group and any remaining Z is hydrogen.

2. An emulsifier for cationic bituminous emulsions comprising the reaction product of (a) an alkyl phenol of the general form

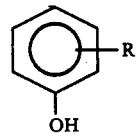

where R represents a linear or branched alkyl group, (b) an aldehyde, and (c) the reaction product of a polyamine and a compound selected from the group of a tall oil fatty acid, a polycarboxylic acid corresponding to the formula

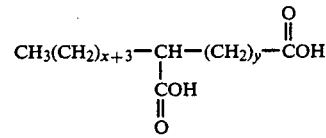

and a polycarboxylic acid corresponding to the formula

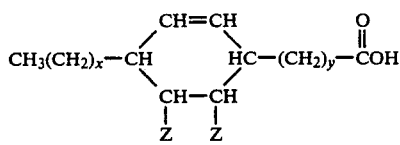

wherein x and y are integers from 3 to 9, x and y together equal 12, at least one Z is a carboxylic acid group and any remaining Z is hydrogen.

3. The emulsifier of claim 2 wherein said alkyl group comprises from 8 to 20 carbons.

4. The emulsifier of claim 2 wherein said alkyl phenol is selected from the group of octylphenol, nonylphenol and dodecylphenol.

5. The emulsifier of claim 2 wherein said aldehyde is formaldehyde.

6. The emulsifier of claim 2 wherein said polyamine is a blend of polyamines comprising aminoethylpiperazine and triethylene tetramine.

7. The emulsifier of claim 2 wherein said alkyl phenol is selected from the group of octylphenol, nonylphenol and dodecylphenol, said aldehyde is formaldehyde, and said polyamine is a blend of polyamines comprising aminoethylpiperazine and triethylene tetramine.

* * * * *

UNITED STATES PATENT AND TRADEMARK OFFICE
CERTIFICATE OF CORRECTION

PATENT NO. : 5,019,168
DATED : May 28, 1991
INVENTOR(S) : Peter Schilling

It is certified that error appears in the above-indentified patent and that said Letters Patent is hereby corrected as shown below:

Column 12, line 59, delete "Were" and substitute therefor --were--.

Column 13, line 34, delete "phenolyamines" and substitute therefor-- phenol:amines--.

Signed and Sealed this

Nineteenth Day of October, 1993

Attest:

BRUCE LEHMAN

Attesting Officer    Commissioner of Patents and Trademarks